(12) United States Patent
Benedetti

(10) Patent No.: US 6,834,806 B2
(45) Date of Patent: Dec. 28, 2004

(54) METHOD FOR LOCATING THE TRANSITIONS BETWEEN THE ELEMENTS OF A BAR CODE

(75) Inventor: Michele Benedetti, Lippo di Calderara di Reno (IT)

(73) Assignee: Datalogic S.p.A., Bologna (IT)

( * ) Notice: Subject to any disclaimer, the term of this patent is extended or adjusted under 35 U.S.C. 154(b) by 301 days.

(21) Appl. No.: 09/793,405

(22) Filed: Feb. 27, 2001

(65) Prior Publication Data

US 2002/0056753 A1 May 16, 2002

(30) Foreign Application Priority Data

Nov. 14, 2000 (EP) .............................................. 00830751

(51) Int. Cl.[7] .......................... G06K 7/10; G06K 19/06; G06K 9/22; G02B 26/10
(52) U.S. Cl. ............................ 235/462.25; 235/462.16; 235/462.08
(58) Field of Search ....................... 235/462.25, 462.01, 235/462.06, 462.27, 462.07, 467.28

(56) References Cited

U.S. PATENT DOCUMENTS

| | | | | |
|---|---|---|---|---|
| 3,684,868 A | * | 8/1972 | Christie et al. ......... | 235/462.04 |
| 5,061,843 A | * | 10/1991 | Sato et al. ............. | 235/462.27 |
| 5,068,520 A | * | 11/1991 | Sato ..................... | 235/462.27 |
| 5,140,146 A | * | 8/1992 | Metlitsky et al. ....... | 235/462.26 |
| 5,210,397 A | * | 5/1993 | Eastman ................ | 235/462.16 |
| 5,298,728 A | | 3/1994 | Elliott et al. | |
| 5,545,888 A | | 8/1996 | Barkan et al. | |
| 5,734,152 A | * | 3/1998 | Goren et al. ............ | 235/462.27 |
| 5,786,582 A | * | 7/1998 | Roustaei et al. ........ | 235/462.07 |
| 6,042,012 A | * | 3/2000 | Olmstead et al. ....... | 235/462.41 |
| 6,073,849 A | * | 6/2000 | Colley et al. ........ | 235/462.27 |
| 6,073,851 A | * | 6/2000 | Olmstead et al. ...... | 235/462.45 |
| 6,176,429 B1 | * | 1/2001 | Reddersen et al. .... | 235/462.25 |
| 6,193,158 B1 | * | 2/2001 | Hecht et al. .......... | 235/462.16 |
| 6,202,928 B1 | * | 3/2001 | Boersma ................. | 235/462.1 |
| 6,206,289 B1 | * | 3/2001 | Sharpe et al. .......... | 235/462.12 |
| 6,209,788 B1 | * | 4/2001 | Bridgelall et al. ..... | 235/462.32 |
| 6,385,352 B1 | * | 5/2002 | Roustaei ..................... | 382/324 |
| 6,505,778 B1 | * | 1/2003 | Reddersen et al. .... | 235/462.25 |
| 6,572,018 B1 | * | 6/2003 | Lucera et al. .......... | 235/472.01 |
| 2002/0000469 A1 | * | 1/2002 | Lucera et al. .......... | 235/462.23 |
| 2002/0000856 A1 | * | 1/2002 | Jung .......................... | 327/158 |
| 2004/0004127 A1 | * | 1/2004 | Nakamura et al. ..... | 235/462.26 |

FOREIGN PATENT DOCUMENTS

JP  03058180 A  *  3/1991  ............ G06K/7/00

* cited by examiner

Primary Examiner—Karl D. Frech
Assistant Examiner—Daniel Walsh
(74) Attorney, Agent, or Firm—Nixon & Vanderhye, P.C.

(57) ABSTRACT

For reading bar and stacked codes, transitions between code elements are determined by crossing points between a sampled video signal, representative of the intensity of light diffused by a code along a scan line thereof, and a low-pass filtered version thereof, or between two low-pass filtered versions thereof. The method is suitable to be implemented through analog or digital hardware, and via software.

27 Claims, 6 Drawing Sheets

METHOD FOR LOCATING THE TRANSITIONS BETWEEN THE ELEMENTS OF A BAR CODE

BACKGROUND

I. Field of the Invention

The present invention relates to a method for locating the transitions between the elements of a bar code.

II. Prior Art and Other Considerations

In this description and the following claims, the expression "bar code" encompasses also "stacked" codes, that is, with more stacked bar sequences.

As known, a bar code is an optical code, printed or otherwise marked on a support, for example a label, a package, etc., consisting of a sequence of dark, typically black, rectangular elements called bars, separated by light, typically white rectangular elements called spaces. The sequence of elements is bounded at both sides by much larger zones, called "quite zones".

The desired information is coded in the number of elements present and/or in the width of each of them. More in particular, a system for coding information through bar codes provides for an alphabet whose symbols are bars and spaces having different widths, typically multiple of a fundamental width called the code "module".

The operations needed to read the "word"—that is, the set of symbols of said alphabet—represented by a specific bar code essentially comprise the code illumination, the detection of the light diffused by it through a suitable photodetector, its conversion into an electrical signal, the processing of the electrical signal and its intepretation, or decoding.

The light source can comprise LEDs or lasers, whereas the photodetecting element can comprise a single photodiode, a linear or matrix CCD (Charge Coupled Device) or C-MOS (Complementary Metal Oxide Semiconductor). Moreover, the bar code can be read both by fixed and portable readers. Furthermore, part of the operations for processing the electrical signal and for interpreting and decoding it can be carried out at a remote station.

In all of the above mentioned types of readers, at the output of the photodetector an analog electrical signal is obtained, referred to as "analog video signal" in the following description, which reproduces the reflectance modulations of the elements forming the code along a scan line, or "scan", of the same code. In fact, the light with which the code is illuminated is absorbed by the bars and reflected by the spaces. Thus, the analog video signal has an alternate pattern with peaks at the spaces, valleys at the bars and rising and falling edges at the transitions between bars and spaces, and vice versa.

In the prior art, the subsequent processing for decoding the bar code can occur directly on the analog video signal, or prior to said subsequent processing, the analog video signal can be sampled, thus obtaining a "sampled video signal" which, of course, maintains said features. Typically, the processing on the analog video signal is carried out with hardware components, while processing on the sampled video signal is carried out via software.

In the following description and attached claims, the expression "sampled signal" encompasses also its software representation.

Moreover, the not further qualified expression "video signal" is used to indicate an indifferently analog or sampled video signal, whereas—where important—a video signal shall be further qualified.

The ideal alternate pattern of the video signal is however subject to several non-ideal factors.

A first non-ideal factor is due to the fact that the smaller the elements, that is to say, the higher the code resolution, the less marked the respective peaks or valleys of the signal.

An analogous non-ideal factor is present in low contrast codes, that is to say, in which the difference of luminosity between bars and spaces is small, for example due to the nature of the support on which the code is reproduced. The measure of a code contrast is expressed by its "PCS" (Printed Contrast Signal), defined as (Vw−Vb)/Vw, where Vw is the white peak voltage and Vb is the black peak voltage.

Another non-ideal factor is represented by the noise, of electronic nature, due to the reader components, and of ambient nature, due for example to fluctuations in the code illumination.

During the code recognition, said non-ideal factors of the video signal along the scan line may bring to "skipping" one or more narrow elements adjacent wider elements or vice versa, to recognising as elements respectively peaks or valleys that instead are due to noise.

Moreover, the acquisition signal may reflect stains, abrasions, slavering or other damages present in some points of the support bearing the code. To prevent the errors caused thereby, a plurality of scans along different code lines is usually carried out during the reading of a bar code.

Another non-ideal factor may be represented by the uneven envelope, typically bell-wise, of the video signal along the scan line, such that at the edges of the code the peaks or the valleys, respectively, have a lower intensity than at the central portion of the code. An uneven envelope may be caused, for example, by the different illumination of the various code portions, in particular in readers where the entire code width is illuminated simultaneously, typically through a series of LEDs, and/or by the losses at the edges of the photodetector, in particular in the above-cited linear sensors.

In the processing and decoding of the video signal, it is essential to be able to establish with great precision the width of the bar code elements.

Among the known methods for evaluating the width of the bar code elements, some are based on locating the transitions between the elements of the code, from which the width of the same elements is then obtained.

However, said known methods for locating the transitions between the bar code elements, implemented both through hardware and software, are quite complex and such as to require the use of many components, or the use of large-capacity memories, of multipliers and microprocessors having a high computational capability, such as DPSs (Digital Signal Processors).

The technical problem at the basis of the present invention is that of allowing locating the transitions between the elements of a bar code in a quick and reliable manner also in readers having limited resources for processing the video signal.

SUMMARY

In a first aspect thereof, the invention relates to a method for locating the transitions between the elements of a bar code, comprising the steps of:

a) providing a video signal representative of the intensity of light diffused by the code as a function of the position along a scan line of the code, b) carrying out at least one low-pass filtering of the video signal (S) for obtaining a respective filtered signal (Fa, Fb, Fc), c) carrying out at least one comparison between a first comparison signal (A) selected between the video signal (S) and a first filtered signal (Fa, Fb), and a second comparison signal (B), being a filtered signal (Fb, Fc), the second comparison signal (B) being more strongly filtered than the first comparison signal (A), recognising the crossings between the compared signals as transitions between elements of the code at the respective positions.

In this description, the expression "more strongly filtered" is used to indicate the signal filtered with a lower cut-off frequency, and in this meaning the video signal is regarded as filtered with an infinite cut-off frequency.

In fact, the Applicant has recognised that the low-pass filtering has the effect of reducing the peak-to-valley dynamics of the video signal—in a way that is inversely related to the filtering cut-off frequency—still maintaining its mean value.

At the same time, the low-pass filtering advantageously has the effect of suppressing high-frequency noise.

Therefore, the video signal and a filtered version thereof, as well as two versions thereof filtered with different cut-off frequencies, thus cross each other exactly in high slope zones around the mean value, that is to say, at the rising and falling edges present in the video signal—which as said accurately represents the waveform of the luminous intensity—at the transitions between bars and spaces.

Locating the transitions is thus provided by a simple comparison operation between the homonymous values of the two signals, that is, between the values that the two signals (analog signals, sampled/numerical signals or their software representation) have at the same position in the scan line.

Moreover, it must be noted that knowing the transitions between bars and spaces is sufficient to recognise the word represented by the bar code since the element widths are obtained from the distance between the transitions, obtained for example by subtracting the respective coordinates of position, and the element type is obtained by considering that a bar code always begins (and ends) with a bar, and that the element types alternate.

The recognition of the word represented by the code can be carried out at the same time as the execution of the comparison, or afterwards.

The above method exhibits the advantages of a precise, stable, reliable, quick and repeatable processing.

The above method also exhibits the advantage that it can be implemented both with analog hardware components, and with digital hardware components, and via software.

In a first embodiment, the video signal is an analog video signal, and the filtering is an analog filtering.

In this case, the step c) of comparison can be carried out on the analog signals.

As an alternative, it can be provided to sample the comparison signals, and to carry out the step c) of comparison on the sampled comparison signals.

In order to limit the phase shift between the comparison signals, the analog filtering is preferably carried out with an almost constant group delay.

In a second embodiment, the video signal is a sampled video signal, and the filtering is a digital filtering.

Preferably, the digital filtering is of the linear phase FIR type.

A filtering of this type is equivalent to performing a weighed average of the intensity values of a certain number—called "order" of the filtering—of samples among the considered sample and those adjacent to it. As the number of samples increases, the filtering intensity increases. The samples can be all subsequent, all preceding, or a combination thereof.

Being based on local averages, the method is i.a. suitable for sampled video signals with variable envelope, as those generated by linear sensors.

It must be noted that the absence of filtering, that is, the use, in step c), of the sampled video signal provided in step a), can also be regarded as an order 1 filtering. This may be particularly advantageous in a parametrical implementation.

More preferably, the filtering is of the equal-coefficient FIR type.

In other words, the samples are averaged with a non-weighed averaging operation. This allows reducing the multiplication operations, thus simplifying the digital circuit or the software, quickening the computation.

Even more preferably, the filtering is of the unitary-coefficient FIR type.

This allows totally avoiding the burdensome multiplication operations, thus making a hardware multiplier superfluous, and further simplifying the software. Thus, the filtering operation is quick, for example allowing the method to be implemented through a microcontroller having moderate processing capability.

Even more advantageously, the filtering is of the FIR type, of an order equal to a power of the base in which the sampled video signal is expressed, in particular, to a power of 2.

This provision allows quickening the filtering even more since the division by the number of samples can consist in a digit-shifting operation, in particular a bit-shifting operation, for example through a shift register or an equivalent software processing.

In a particularly preferred way, the filtering is carried out sample by sample during execution of the comparison step.

This allows dramatically reducing the required memory capacity.

In both embodiments, for each comparison of step c) the method can further comprise the steps of:

d) regarding a transition recognised in step c) as valid when in at least one position preceding the subsequent transition in the opposed direction recognised in step c), the absolute value of the difference between the comparison signals is greater than a preselected threshold quantity.

The expression "direction" of a transition is used to indicate whether the transition is falling, that is, the first comparison signal changes from higher than the second comparison signal to lower than it, or rising, that is, the first comparison signal changes from lower than the second comparison signal to higher than it.

In this way, a hysteresis is introduced in the recognition of the transitions, subordinating said recognition to crossing of a threshold—respectively higher or lower than the second comparison signal—being checked, so as to prevent recognising the small ripples due to noise as transitions.

In step d), the crossing check, that the difference absolute value is greater than the threshold quantity, can be carried out by providing, for the positions considered, a reference signal having an intensity corresponding to the intensity of the second comparison signal, increased or respectively decreased by the threshold quantity, and comparing the comparison signal with the reference signal.

Moreover, advantageously, the threshold quantity is variable.

In particular, the falling threshold quantity for positions corresponding to points of the code quite zones is greater than the threshold quantity for positions within the code.

The expression "quite zones" is used to indicate the extended white zones present at the edges of a bar code.

In this way, the fact that the signal/noise ratio in the quite zones is typically less than within the code is taken into account.

The quite zone boundaries can be identified with known code localisation methods.

However, the threshold crossing provided for in step d) inherently brings to identifying the quite zone boundaries.

If the code is to be localised only, it is sufficient to provide, for each comparison of step c), the steps of:

e1) rejecting all transitions recognised in step c) corresponding to positions preceding the first position wherein the difference between the first comparison signal and the second comparison signal is greater than a preselected threshold quantity, except for the transition corresponding to the immediately preceding position, and e2) rejecting all transitions recognised in step c) corresponding to positions subsequent to the last position wherein the difference between the first comparison signal and the second comparison signal is greater than the preselected threshold quantity, except for the transition corresponding to the immediately subsequent position.

Moreover, when in step b) at least two filtering operations are carried out, and in step c) at least two comparisons are carried out, the method can further comprise the steps of:

f1) comparing the sets of transitions obtained in the comparisons of step c), and f2) selecting the most suitable set of transitions for decoding.

As an alternative, all sets of transitions obtained in the comparisons of step c) are provided for decoding.

In a particularly preferred embodiment, increasingly strongly filtered signals, including the absence of filtering, are compared in pairs, wherein each signal filtered with intermediate strength can be subject to two comparisons.

The various comparisons are preferably carried out in parallel, sample by sample.

As an alternative or in addition, the method can further comprise the steps of:

g) repeating at least once the previous steps for a respective video signal of a subsequent code scan, g11) comparing the sets of transitions obtained in the comparisons of step c), and g12) selecting the most suitable set of transitions for decoding.

By thus providing an analogous processing of signals corresponding to different scan lines, the method allows rejecting apparent transitions, due for example to code impurities in some areas, or to temporary reading errors, caused for example by imperfection in the code focusing, unevenness of the ambient light, and so on.

Alternatively to steps g11, g12, all sets of transitions obtained in the comparisons of step c) can be provided for decoding.

As an alternative or in addition, the further following steps can be comprised:

g) repeating at least once the previous steps for a respective video signal of a subsequent code scan, g21) evaluating statistical parameters relating to the video signal and/or to the sets of recognised transitions, and g22) setting the operating parameters for a subsequent iteration based on the statistical parameters evaluated in the previous iteration.

By providing a feedback during the processing of signals corresponding to different lines along the code, the method is extremely reliable, as it can be auto-controlled.

In particular, the statistical parameters can comprise the absolute minimum, the absolute maximum and the peak-to-peak level of the digital video signal, the module and the PCS of the optical code, and the minimum signal/noise ratio of the digital video signal.

This statistical information can be used to assign the cut-off frequency pairs to be used—in particular the FIR filtering orders—, the number of comparisons to be carried out and the values of the threshold quantity.

As it has been seen, the above method is particularly suitable to be implemented through a processing program, as it is very flexible in terms of parameterisation, design, upgrading and testing.

In the present description and attached claims, the expression "processing program" refers to a software suitable to be executed both on a computer and on a microcontroller.

Thus, in a second aspect thereof, the invention relates to a processing program comprising program code means suitable to carry out the steps of the above method when the program is executed on a computer.

In a particularly preferred way, the program is embodied in a microcontroller.

Since the method illustrated above requires simple operations, a low-performance microcontroller is sufficient, with further advantages in terms of costs As an alternative, in particular when the recognising of the word represented by the code occurs at a remote station from the bar code reader, the program is stored in a computer memory, embodied in a read-only memory or carried on a carrier electrical signal, namely when broadcast on a computer network, among which the Internet.

In another aspect thereof, the invention further relates to an electronic circuit suitable to carry out the steps of the above method.

The electronic circuit can comprise only analog components, only digital components, or both analog and digital components.

In another aspect thereof, the invention further relates to a bar code reader comprising a microcontroller or a digital circuit embodying the above method.

BRIEF DESCRIPTION OF THE DRAWINGS

Features and advantages of the invention shall now be illustrated with reference to embodiments shown by way of a non-limitative example in the attached drawings. In such drawings.

DETAILED DESCRIPTION

Figure 1:
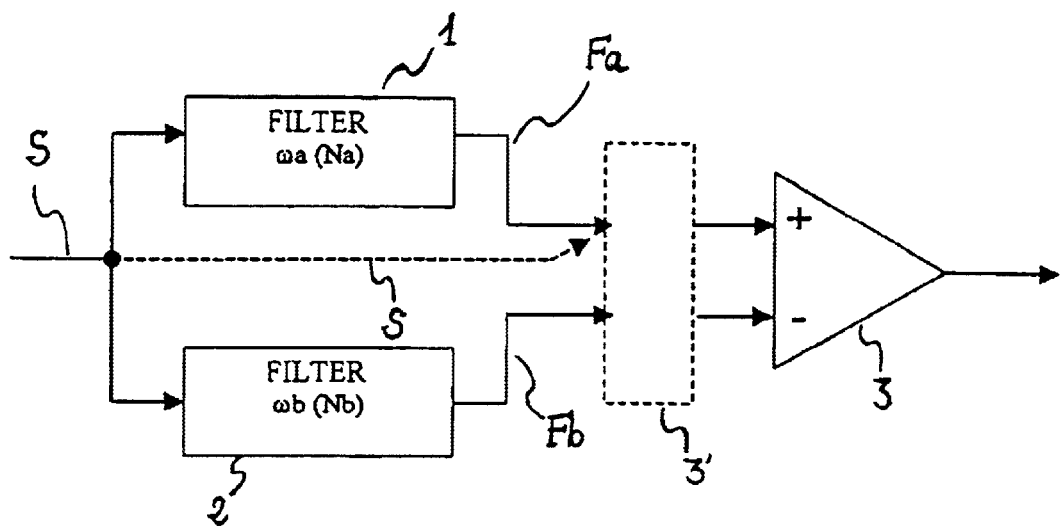
FIG. 1 shows, as block diagram, the principles of the method according to the invention.

With reference to FIG. 1, in the method for locating the transitions between the elements of a bar code, an analog or sampled video signal S is first provided.

The video signal S typically is the analog signal output by the photodetector of a bar code reader, or the sampled video signal, in a per se known manner. Of course, the sampling frequency and the resolution of the quantization shall be properly selected so that the samples of the sampled video signal S accurately represent the intensity of the light diffused by the code along the scan.

The video signal S is fed to a first low-pass filter 1 having a first cut-off frequency $\omega a$.

Moreover, the video signal S is fed to a second low-pass filter 2, having a second cut-off frequency $\omega b$, with $\omega b < \omega a$.

The output filtered signal Fa of the first filter 1 is fed to a first input, or positive input, of a comparator 3.

The output filtered signal Fb of the second filter 2 is fed to a second input, or negative input, of comparator 3.

As an alternative, as shown by the dashed line, the video signal S is directly fed to the first input of comparator 3.

In the following description, the first input signal to comparator 3 will be referred to as first comparison signal A, the second input signal to comparator 3 will be referred to as second comparison signal B. The crossings between the comparison signals A, B are detected by the fact that the difference between signals changes sign.

As shown in dashed lines, a sampling section 3' can be inserted upstream of the comparator.

In the case of an analog video signal S, the low-pass filters 1 and 2 are preferably low-distortion analog filters, that is, with an almost constant group delay in the operating band, such as for example fifth order Chebishev filters, or switched-capacitor filters.

The analog comparison signals A, B can be directly fed to comparator 3, which in that case shall be an analog comparator.

The output of comparator 3 is a square wave, with rising and falling edges at the crossing points between the signals present at its inputs. As it shall be understood hereinafter, the crossing points correspond to the transitions between the code elements, which are thereby located.

As an alternative, the analog comparison signals A, B can be fed to the sampling section 3' and then to comparator 3, which in that case shall be a digital comparator, either hardware or implemented through a suitable portion of a software program.

The output of comparator 3 is still representative of the crossing points between the signals present at its inputs, namely of the transitions between the code elements.

On the other hand, in the case of a sampled video signal S, the low-pass filters 1 and 2 are digital filters, or an implementation thereof through a suitable portion of a software program. In this case, of course, the sampling section 3' is missing.

The digital low-pass filters 1 and 2 preferably are linear phase FIR filters. An order N linear phase FIR filter carries out an averaging operation between the considered sample and N−1 samples adjacent to it. As the order N of the filtering increases, the cut-off frequency $\omega$ of the filtering decreases. Thus, filter 1 shall have a lower filtering order Na than the filtering order Nb of filter 2.

Figure 2:
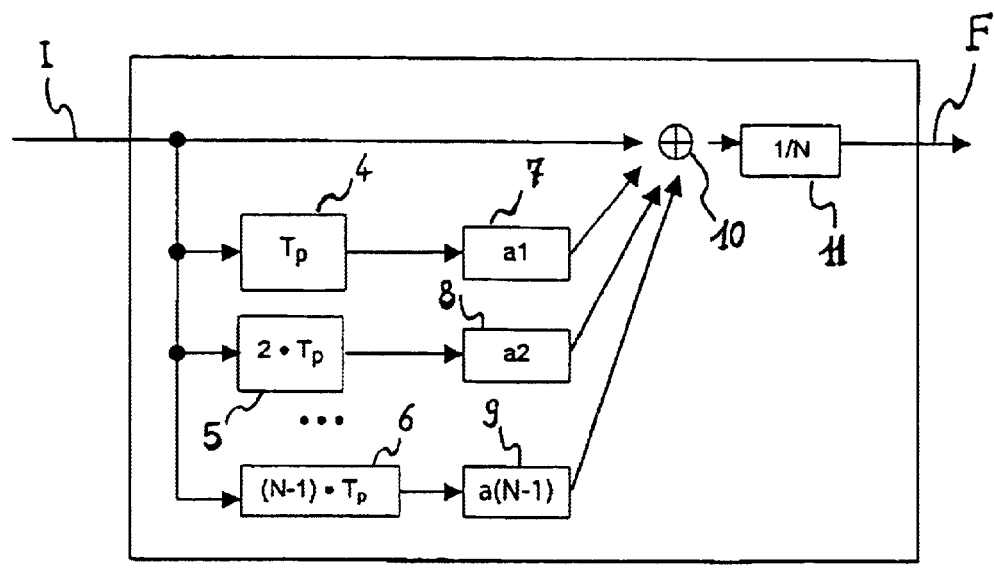
FIG. 2 shows a block diagram representing a digital linear phase FIR filter.

By way of example, FIG. 2 shows an implementation of an order N FIR filter through digital hardware components. The input signal I is fed to N−1 delay blocks 4, 5, ..., 6, whose outputs are multiplied, in respective multipliers 7, 8, ..., 9, by respective coefficients a1, a2, ..., a3. The input signal I and the outputs of multipliers 7, 8, ..., 9 are then added up in an adder node 10 and divided by the order N of the filter in a block 11.

Of course, the samples with which each sample is averaged can be selected differently from the subsequent N−1 samples shown in FIG. 2, for example they can be the preceding N−1 samples, or N/2 preceding samples, and N/2−1 subsequent samples.

If it is not necessary to carry out a weighed average, the FIR filters 1, 2 can have equal coefficients, preferably unitary.

In terms of the diagram of FIG. 2, this corresponds to replacing multipliers 7, 8, ..., 9 with a single multiplier (not shown) immediately upstream of the adder node 10, or to simply eliminating them.

In the preferred embodiment of the method according to the invention, moreover, the order of filters 1, 2 is selected as equal to a power of the base in which the digital values are expressed, typically as a power of 2.

In terms of the diagram of FIG. 2, this corresponds to replacing the division block 11 with a digit-shifting, in particular with a bit-shifting.

As mentioned before, the low-pass filters 1, 2 can be implemented through software instructions.

In said implementation, for example, the order N FIR filtering operation can be expressed by the following Equation (1):

$$F(i)=\Sigma[I(j)a(j)]/N$$

where F(i) indicates the ith sample of the filtered signal, I(j) indicates the ith sample of the input signal, a(j) indicate the coefficients or weights assigned to the individual averaged samples, with a(j)=1 in the preferred embodiment of the method of the present invention, and the summation is to be regarded as extended to N samples comprising the ith sample and N−1 samples adjacent to it.

Figure 3:
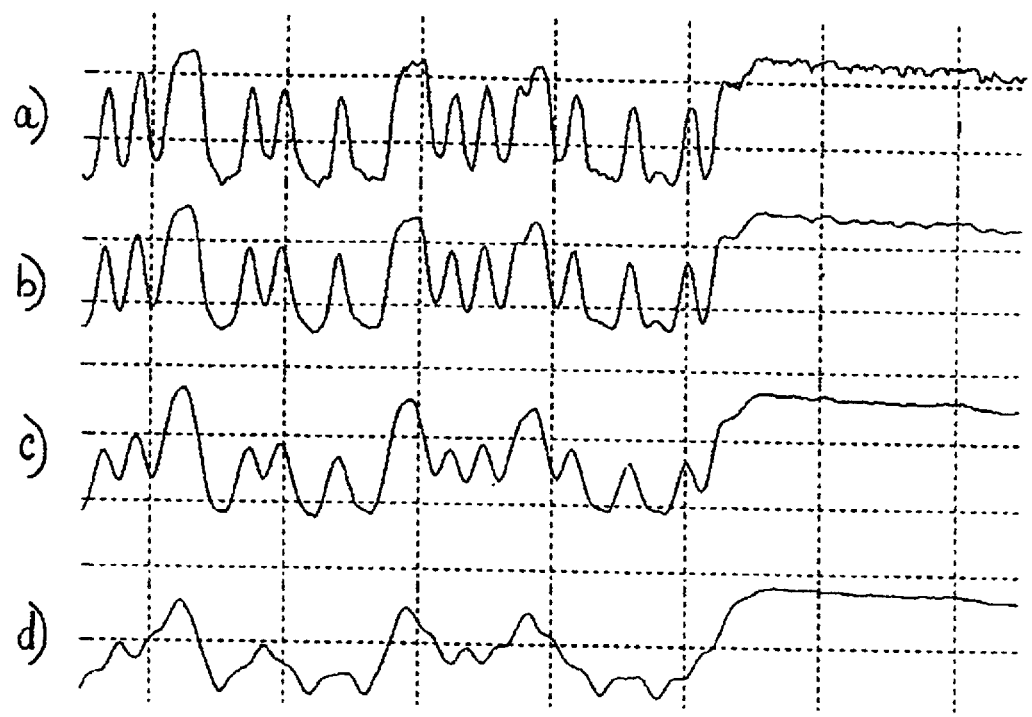
FIG. 3 shows an example of a video signal and of versions thereof filtered with digital unitary-coefficient FIR filters of different orders.

By way of example, FIG. 3 shows in a) the pattern of the sampled video signal S, and in b), c) and d), filtered versions thereof, by a unitary-coefficient FIR filter with increasing order from b) to d). More in particular, in b) there is represented a filtered signal according to order 4, in c) a filtered signal according to order 8, in d) a filtered signal according to order 16.

FIG. 3 shows, more in general, the patterns of a digital or analog video signal S and of the signals obtained with respectively digital or analog low-pass filters.

It can be noted that as the filtering order increases, or more in general, as the filtering cut-off frequency decreases, the filtering becomes increasingly stronger, that is to say that the filtered signals have an increasingly smaller peak-to-valley dynamics with respect to that of the original signal, still maintaining—also locally—the same mean value.

Moreover, the increasing noise suppression as the filtering order increases, or more in general, as the cut-off frequency decreases, can be appreciated.

Thus, at the output of comparator 3, pairs of signals among those shown in FIG. 3 shall tend to cross each other in high-slope zones around the mean value, namely at the rising and falling edges corresponding to the transitions between bars and spaces.

Figure 4:
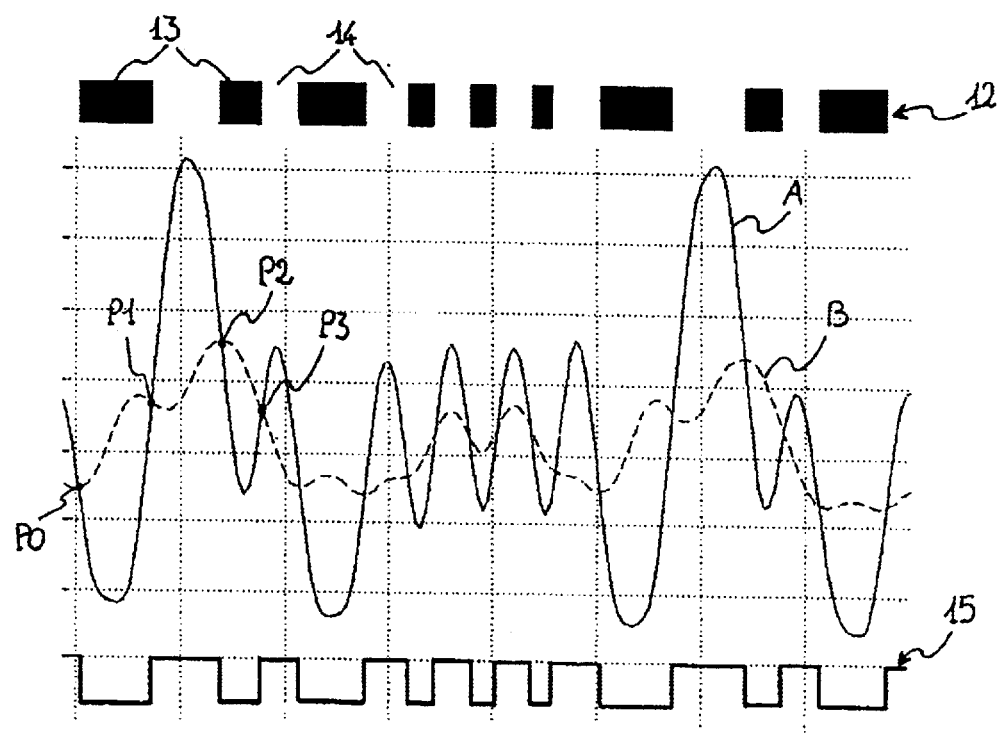
FIG. 4 shows an example of a bar code and of two signals, of which at least one is filtered, compared according to the method of the invention.

By way of example, FIG. 4 shows a bar code 12 and two relevant signals A, B. As explained above, the signal identified with A can be a filtered signal or the non-filtered video signal S.

As it can be noted, signals A and B cross each other at points P0, P1, P2, . . . , P3 corresponding to the transitions between bars 13 and spaces 14 of code 12. Reference numeral 15 shows, as a square wave, the output of comparator 3.

It can be understood that for the purpose of locating the transitions between the elements of a code by locating the crossings between the comparison signals A, B, the cut-off frequencies or in particular, the filtering orders, included the absence of filtering (order one), should be properly selected.

In particular, the higher the code resolution, the wider the band of the video signal S, and thus, in order to prevent distortion, the first comparison signal A should be non-filtered, or filtered according to a low order Na (more in general, with a high cut-off frequency), and also the second comparison signal B should be filtered according to a low order Nb (high cut-off frequency). On the contrary, if the code resolution is low, a high filtering order Nb (low cut-off frequency) should be used at least for the second comparison signal B.

A filtering according to a high order (low cut-off frequency), moreover, shall be proper in the case of a video signal S having strong imperfections, whereas a filtering according to a low order (high cut-off frequency) shall be proper in the case of a low-contrast video signal S.

Figure 5:
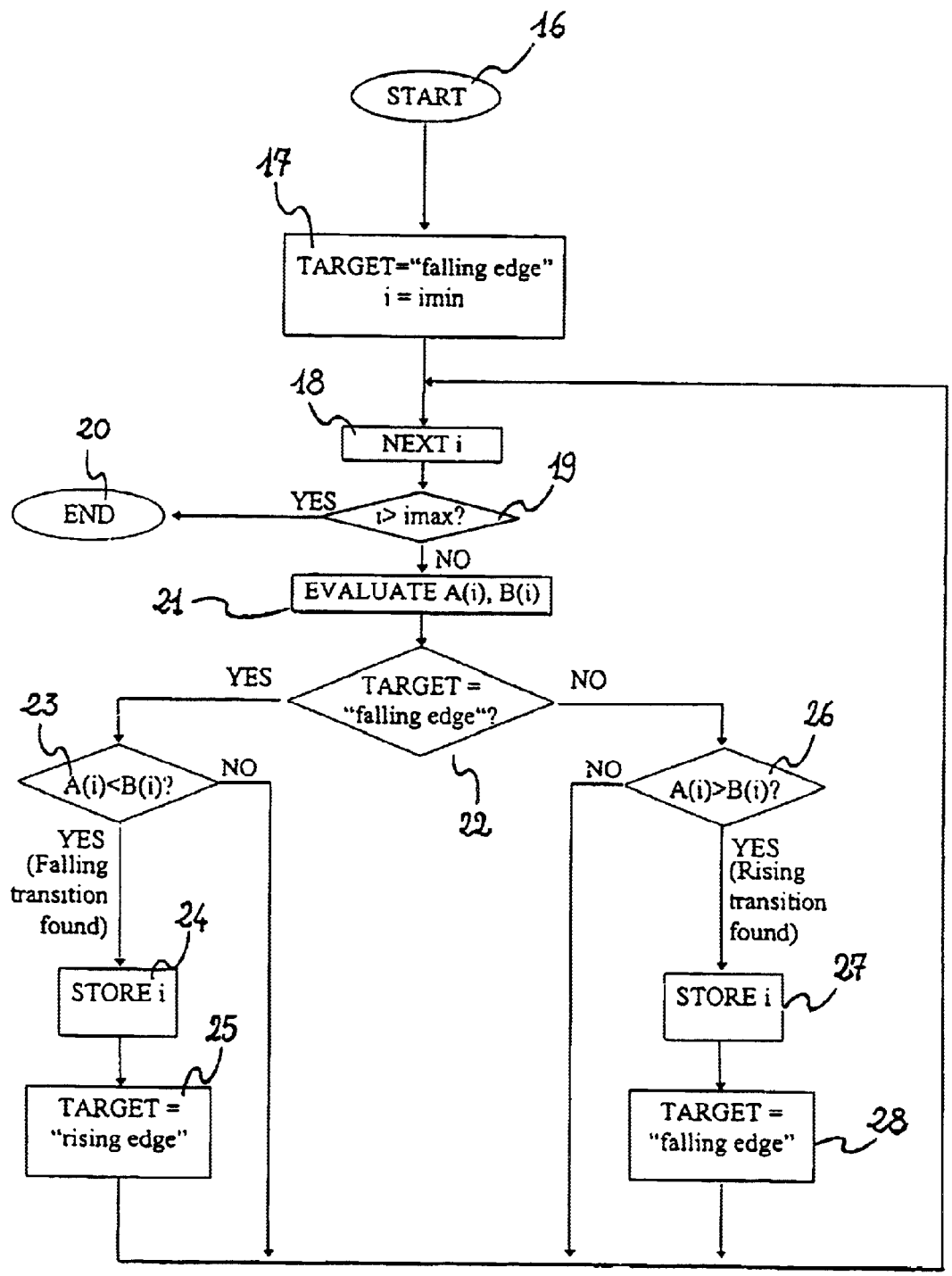
FIG. 5 shows a flow chart useful for describing an embodiment of the method according to the invention.

FIG. 5 shows a flow chart relating to a preferred software implementation in case a sampled video signal S is used.

The sampled video signal S can, for example, be represented by a unidimensional array when the distance between samples—sampling interval—along the scan is constant, by a two-dimensional array when the distance between samples is not constant, or by other suitable structures.

In the flow chart of FIG. 5, the variable i is the index identifying the position along the scan, and X(i) indicates the value of a signal X at the position represented by the value of index i.

At the start, represented by a block 16, in an initialisation block 17 index i is set to zero.

Preferably, moreover, in block 17 a TARGET variable, identifying the type of transition, is set at a value representing the expression "falling edge". In fact, since a bar code always begins with a bar, the first transition to be searched for is a falling transition, that is, a point in which the first comparison signal A changes from higher than the second comparison signal B to lower than it.

A cycle is then carried out, wherein index i is incremented in a block 18, the completion of processing is checked in a block 19, that is to say, whether index i is higher than its maximum value $i_{max}$ and, if so, exit is reached at end block 20.

If the processing has not ended, the values at the ith sample of the two signals A(i) and B(i) selected in the way explained above, are evaluated in a block 21. In particular, FIR filtering operations are carried out in block 21, through expression (1) given above, according to respective orders Na>=0, the case Na=0 representing absence of filtering, namely A(i)=S(i), and with Nb>Na.

It should be noted that the sample-by-sample filtering at block 21 within the cycle is advantageous since it does not require the storage of all values of signals A and B of the entire scan, but only that of the samples of the video signal S needed to obtain the filtering, which are a much smaller number (Na, Nb in case of FIR filtering) than the samples of the entire scan. This makes extremely reduced storage and computation means sufficient, and allows a real time processing of the video signal S.

Then, in a decision block 22, the TARGET variable is checked for a "falling edge" value.

If so, as it occurs at the first cycle iteration, in a block 23 it is checked whether the first comparison signal is falling below the second comparison signal, that is to say, whether A(i) is less than B(i).

In the negative case, the index i increment block 18 is returned to.

In the affirmative case, signals A and B are crossing each other, that is to say, a falling transition is present (point P0 in FIG. 4). Therefore, in a block 24, the value of index i is stored in a set of transitions represented by a suitable variable, preferably a LIFO structure.

Since in a bar code after a bar there is always a space, the next transition to be searched for is a rising transition. Before returning to block 18 of increment of index i, the value of the TARGET variable is thus changed in a block 25 to a value representative of the expression "rising edge".

At the next iteration of the decision block 22, the result shall thus be negative, and the right branch in FIG. 5 shall be entered, analogous to the already described left branch.

In fact, in a block 26, it is checked whether the first comparison signal is rising above the second comparison signal, that is to say, whether A(i) is greater than B(i).

In the negative case, the index i increment block 18 is returned to.

In the affirmative case, signals A and B are crossing each other, that is to say, a rising transition is present (point P1 in FIG. 4). Therefore, in a block 27, the value of index i is stored in the set of transitions, and in a block 28 the TARGET variable is restored to the "falling edge" value.

It should be manifest that the set of conditions expressed in the decision blocks 22, 23 and 26 can be implemented in a different order with respect to that shown.

Moreover, the use of the TARGET variable is—as already said—preferred but not mandatory. In fact, since codes always begin with a bar, the transition type can be recognised by the number of transitions that are already stored in the relevant set being even or odd.

In the first comparison signal A (non-filtered, or filtered with a low order) there can still be some oscillations around the second comparison signal B that do not represent transitions in the bar code.

To prevent wrongly recognising the crossings between signals A and B due to said spurious oscillations, the embodiment described below of the method according to the invention is particularly advantageous.

Figure 6:
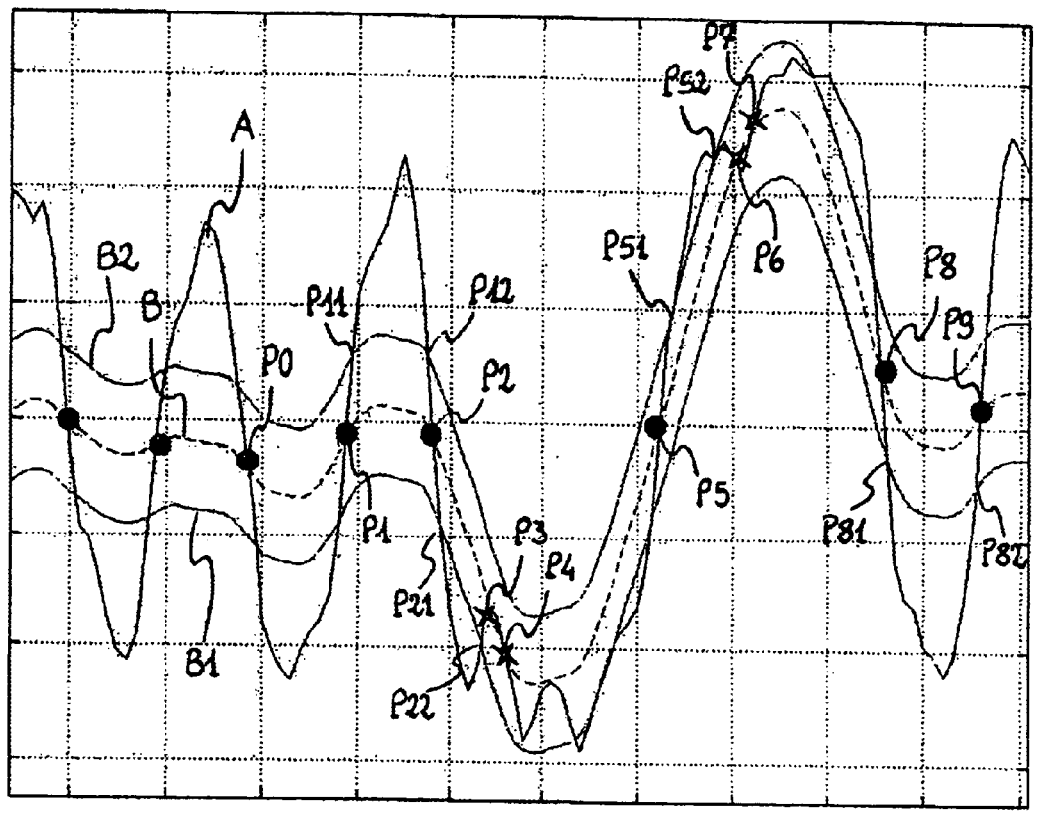
FIG. 6 shows another example of two signals, of which at least one is filtered, compared according to the method of the invention.

With reference to FIG. 6, the crossing points P0, P1, P2, P5, P8, P9 between the comparison signals A and B actually correspond to transitions between code elements.

On the other hand, the crossing points P3, P4, and P6, P7 are due to a spurious peak and a spurious valley.

According to the invention, to avoid recognising such crossing points as transitions, it is provided to regard a crossing—recognised as a transition—as valid when, in at least one position preceding the subsequent transition in the opposed direction, the absolute value of the difference between the comparison signals is greater than a preselected threshold quantity.

In other words, a falling reference signal B1 and a rising reference signal B2 are considered, having an intensity corresponding to the intensity of the second comparison signal B respectively decreased and increased by a threshold quantity $\Delta$.

The first comparison signal A is compared with the falling reference signal B1 for falling transitions, and with the rising reference signal B2 for rising transitions.

A falling or respectively rising transition is rejected if in a position preceding the subsequent rising or respectively falling transition there is not at least one crossing between the first comparison signal A and the falling reference signal B1 or the rising reference signal B2 respectively.

So, the rising transition in P1 is accepted because, before the falling transition in P2, signal A crosses signal B2 in points P11, P12. The falling transition in P2 is accepted because before the rising transition in P3, signal A crosses signal B1 in points P21, P22. On the contrary, the rising transition in P3 is rejected because before the falling transition in P4, signal A does not cross signal B2.

The falling transition in P4 is ignored because, after the falling transition in P2, a rising transition is searched for.

The rising transition in P5 is accepted because, before the falling transition in P6, signal A crosses signal B2 in points P51, P52; the falling transition in P6 is ignored because before the transition in P7, signal A does not cross signal B1; the rising transition in P7 is ignored because a falling transition is searched for, and finally, the transition in P8 is accepted because before the rising transition in P9, signal A crosses signal B1 in points P81, P82.

Essentially, a hysteresis is introduced in the recognition of the transitions, subordinating said recognition to a threshold—respectively higher or lower than the second comparison signal—being crossed, so as to prevent recognising as transitions the small ripples of the video signal contained in the comparison signals A, B and due to noise.

This embodiment of the method of the invention shall be described with reference to a software implementation thereof, but those skilled in the art shall understand that it can be implemented as well through hardware components, both analog and digital. For example, in the analog case, two comparators could be provided, to which the two comparison signals A and B are fed, one of them being a comparator with hysteresis, the outputs of the two comparators being combined according to an AND logical operation.

Figure 7:
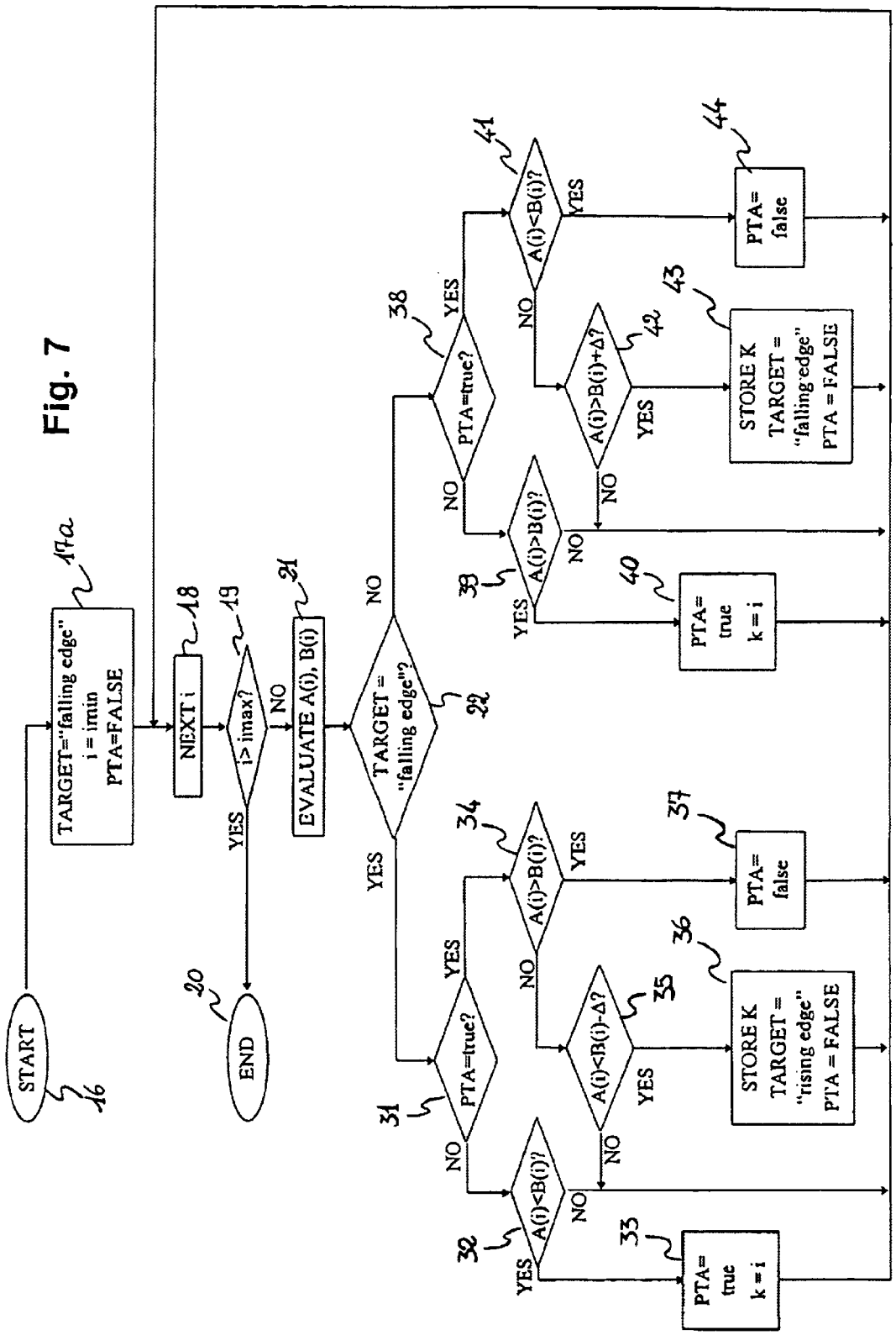
FIG. 7 shows a flow chart useful for describing another embodiment of the method according to the invention.

The block diagram of FIG. 7 shows a cycle structure analogous to the block diagram of FIG. 5, wherein identical blocks are numbered with the same reference numerals, and shall not be described in detail.

Besides the initialisation of index i and of the TARGET variable, in the initialisation block 17a a PTA flag is set to the FALSE logical value, thereby indicating that potential transitions are not available, as it shall be better understood hereinafter.

If the check that the TARGET value is at the "falling edge" value, carried out in the decision block 22, gives a positive result, as it happens in the first iteration of the cycle, a more complex branch than that consisting of blocks from 23 to 25 in FIG. 5 is entered.

The PTA flag is first tested in a block 31.

In the negative case, as at the beginning of the processing, analogously to block 23 of FIG. 5, in a block 32 it is checked whether the first comparison signal is falling below the second comparison signal, that is to say, whether A(i) is less than B(i).

In the negative case, the index i increment block 18 is returned to.

In the affirmative case, signals A and B are crossing each other, that is to say, a falling transition is present (such as, for example, in points P2, P6 and P8 in FIG. 6). Therefore, in a block 33, the value of index i is stored as a temporary transition, for example by assigning its value to a variable k, the PTA flag value is set to TRUE, and the index i increment block 18 is returned to.

Since the TARGET variable value is still set to "falling edge", the result of the subsequent test of decision block 22 is still affirmative. However, the result of the subsequent test of block 31 now is positive, so a block 34 shall be entered, where it is checked whether A(i)>B(i).

In the negative case, in a block 35 it is checked whether the difference between signals A and B is greater than the threshold quantity $\Delta$, that is, whether signal A is lower than the falling reference signal B1=B−$\Delta$. This is expressed by the evaluation of the inequality A(i)<B(i)−$\Delta$.

In case of negative result of block 35, the index i increment block 18 is returned to. In the following iterations, since the TARGET and PTA variables have not been updated, the decision block 34 of comparison between signal A and signal B shall be reached again.

If the result of the check of block 35 is positive, as when from point P2 point P21 is reached in FIG. 6, the previous falling transition at P2, which had been temporarily stored in step 33, is to be regarded as valid.

In a block 36, the value of variable k is therefore stored in the set of transitions. Since the subsequent transition must be a rising one, this is indicated by switching the TARGET variable value to the value representative of the expression "rising edge". Moreover, as a potential transition is not available anymore, the value of the variable indicating this is updated by setting PTA to FALSE.

On the other hand, let's consider that the transition temporarily stored in step 33 corresponds to point P6 of FIG. 6. In this case, when index i reaches point P7, the test of block 34 gives a positive result, that is, a rising transition has been found, signal A having however never fallen below the falling reference signal B1, that is, block 36 having not been passed through.

A block 37 is thus entered, wherein the temporarily stored falling transition (at P6 in FIG. 6) is rejected, and the flag variable indicating the existence of a potential transition is set to the negative logical value (PTA=FALSE). Then, the index i increment block 18 is returned to. Note that the TARGET variable is not updated, since a falling transition is still searched for.

For the next values of index i, block 32 of searching for of a potential falling transition is reached again. The transition in P7 shall be ignored because it is a rising transition (that is, the test of block 32 will give a negative result at transition P7), whereas the transition in P8 shall be accepted because before the rising transition in P9, signal A crosses the falling reference signal at point P81.

A mirrored branch is executed when the subsequent expected transition is a rising transition, namely when the result of the test in block 22 is negative.

So, at first said branch comprises a PTA flag test block 38. In case of a negative result (such as before point P3), said potential rising transition is searched for by carrying out the check A(i)>B(i) in a block 39, whose output corresponding to the negative result brings back to the index i increment block 18. In case of positive result (point P3), in a block 40 the potential rising transition is stored in variable k, and its existence is indicated by setting PTA to TRUE. For the next values of index i, the test of decision block 38 thus has a positive result, and in a block 41, a falling transition is searched for by checking whether A(i)<B(i). As long as the signal continues to rise, the result of the test of block 41 is negative, and a block 42 is entered for checking the crossing of the rising reference threshold, expressed by condition A(i)>B(i)+Δ. If this test gives a negative result, the value of index i is incremented by returning to block 18. If said test gives a positive result, as at point P11 when the temporarily stored transition is point P1, the temporarily stored transition is validated in a block 43 (the value of k is stored in the set of transitions), the value of the flag indicating the existence of potential rising transition is set to the false logical value (PTA=false), and the TARGET variable value is switched to the value representative of the expression "falling edge". If, on the contrary (as at point P4 when the temporarily stored transition is point P3), the result of the test of block 41 is positive, the potential rising transition (in P3) is invalidated in a block 44, by setting the value of the flag indicating the existence of potential rising transition to the false logical value (PTA=false).

As it shall be understood from what said above, the method just described can be particularly advantageous for obtaining the localisation of a bar code using the falling reference signal B1.

Figure 8:
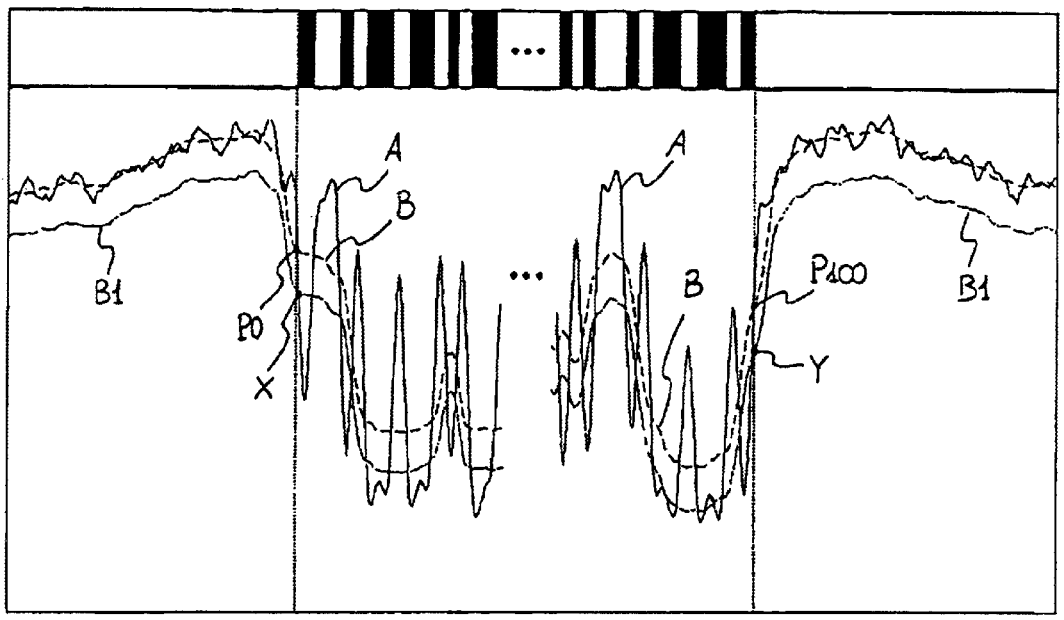
FIG. 8 shows another example of two signals, of which at least one is filtered, compared according to an embodiment of the method of the invention, suitable to identifying the boundaries of the quite zones of a bar code.

More in particular, with reference to FIG. 8, since the quite zones are white zones, that is to say, with high reflectivity, for mere code localisation it is sufficient to provide the falling reference signal B1, compare the first comparison signal A with said falling reference signal B1, and reject all transitions (crossings between signals A and B) corresponding to positions preceding the first crossing X between signals A and B1, except for transition P0 corresponding to the immediately preceding position, and reject all transitions (crossings between signals A and B) corresponding to positions subsequent to the last crossing Y between signals A and B1, except for the transition corresponding to the immediately subsequent position P100.

The method according to the invention wherein only the falling reference signal B1 is used is not shown in detail, as the simplifications to be made to the analog or digital hardware circuit, or to the software, are regarded to be within the skills of the average skilled in the art.

In order to obtain good performances of the above method, the noise immunity threshold should be given by expression Δ=Vpp/(S/N)min, where Vpp is the peak-to-peak voltage of the video signal S, and (S/N)min is the minimum signal/noise ratio of the video signal S. Since the signal/noise ratio in quite zones typically is less than within the code, the threshold quantity Δ for comparisons in positions corresponding to points of the quite zones can be greater than the threshold quantity Δ for comparisons in positions within the code.

For further improving the method performances, the threshold quantity Δ can also be variable within the code, Δ(i), for example it could be calculated as a percentage of the value of the first comparison signal A(i) at the homonymous sample.

It is worth noting that the knowledge of the transition points Pi is sufficient to recognise the word represented by the bar code. The recognition of the word represented by the code can be carried out at the same time as the comparison, or afterwards.

As already mentioned, the cut-off frequencies ωa, ωb, or the filtering orders Na, Nb, and the threshold quantity Δ, represent the operating parameters of the described method. The selection of the respective values can be carried out in various ways.

Figure 9:
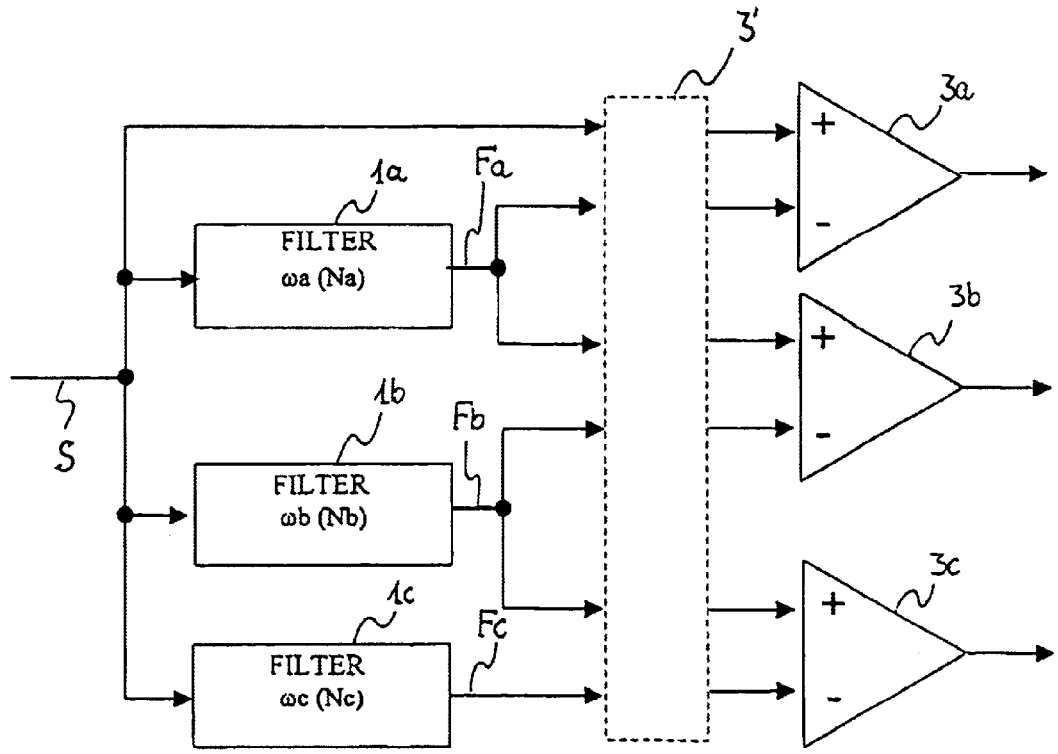
FIG. 9 shows the principle diagram of an embodiment of the method wherein more comparisons between signals, of which at least one is filtered, are carried out.

FIG. 9 shows the principle diagram of an implementation of a parallel architecture, wherein the video signal S is fed to a series of low-pass filters 1a, 1b, 1c, . . . , having decreasing cut-off frequencies ωa>ωb>ωc, . . . , or, increasing orders Na<Nb<Nc, . . . .

The video signal S and the output signals Fa, Fb, Fc of filters 1a, 1b, 1c, . . . are fed in pairs to comparators 3a, 3b, 3c, . . . , optionally after the passage through the sampling section 3' in case the video signal S and filters 1a, 1b, 1c are analog, but comparators 3a, 3b, 3c, . . . are digital, or implemented through software. More in particular, the first comparator 3a receives as inputs the video signal S and the output signal Fa of the first filter 3a, the second comparator 3b receives as inputs the output signal Fa of the first filter 3a and the output signal Fb of the second filter 3b, the third comparator 3c receives as inputs the output signal Fb of the second filter 3b and the output signal Fc of the third filter 3c, etcetera.

Of course, each filtered signal Fa, Fb, Fc, . . . could be fed to a single comparator, that is to say that in the block diagram of FIG. 9, the central comparator 3b could be missing.

Also, the signals could be fed to comparators 3a, 3b, 3c in different combinations, for example by providing a switching or selection section (not shown) between the input of the video signal S and the inputs to filters 1a, 1b, 1c and/or at the inputs of comparators 3a, 3b, 3c'.

The outputs of comparators 3a, 3b, 3c, . . . represent different sets of transitions of the bar code being examined. During reading of the bar code, the decoding can be performed according to different criteria. A first criterion could be that of decoding the first set of transitions obtained and, if said decoding gives a valid code, ignoring the others. If, on the contrary, the decoding of said first set does not give a valid code, proceeding with the decoding of the next set, and so on, until a valid code is obtained. A second criterion could be that of decoding all sets of transitions so as to obtain different decodings of the same code, associating a quality index to said different decodings, and accepting that decoding exhibiting the best quality index as the valid decoding. Still another criterion could be averaging (according to different criteria) the widths of the homologous elements obtained from the different sets of transitions, thus obtaining a single series of widths of the "compensated" code elements, then decoding only said series of widths.

Of course, a parallel architecture of this type can also be extended to the case of comparison with hysteresis described above. In this case, in place of the simple comparators 3a, 3b, 3c, the above described analog or digital hardware blocks shall be present, optionally providing also for varying the threshold quantity Δ.

It is also manifest that in a software implementation, this embodiment can be easily implemented by repeating the flow chart of FIG. 5 or of FIG. 7—or their respective portion comprised between the output of block 20 and the return to block 18—for the desired number of times, changing every time the execution of block 21 of evaluation of the comparison signals, and the variable within which the transitions recognised in blocks 24, 27, 36, 43, 45 are stored.

As an alternative or in addition, the above method can be repeated for a series of different video signals S, each relating to a different code scan.

Also in this case, the set of transitions used for reading the code can be selected among those obtained during the various executions based on the above criteria.

However, in a preferred embodiment, the method of the present invention provides for using the execution carried out on a video signal $S_j$, relating to a code scan, for setting the parameters of the following execution, carried out on a video signal $S_{j+1}$ relating to a subsequent scan.

By providing in this way an analogous processing of signals corresponding to different scans, it is possible to reject apparent transitions, due for example to impurities of the code in certain areas, or to temporary reading errors, caused for example by an imperfection in the code focusing, by unevenness of the ambient light, etcetera.

In particular, during each iteration, one or more of the following statistical parameters can be evaluated:

absolute maximum of the video signal: $M = \max_i\{S(i)\}$ absolute minimum of the video signal: $m = \min_i\{S(i)\}$ peak-to-peak level of the video signal: $Vpp = M - m$ minimum signal/noise ratio of the video signal $(S/N)min$ PCS of a bar code corresponding to the recognised transitions, module of a bar code corresponding to the recognised transitions.

As mentioned at the beginning, the module of a bar code is given by the width of the code element having minimum width. An estimate of the module can be obtained as the average of a certain number of values expressing the minimum recognised widths, for example as the average of the 10 smallest recognised widths.

In a hardware implementation, setting of the filtering order can, for example, be carried out—as said before through commutators or selectors between the input of the video signal S and the inputs of filters $1a$, $1b$, $1c$, . . . , or between the outputs of filters $1a$, $1b$, $1c$, . . . , and the outputs of comparators $3a$, $3b$, $3c$, . . . .

In a software implementation, on the other hand, it is sufficient to make the expression of the comparison signal evaluation of block 19 parametrical, in particular to make the expression of the filtering—expressed by equation (1)—parametrical.

The above method exhibits the advantages of a simple, precise, stable, reliable, quick and repeatable processing.

Moreover, its implementation through software exhibits the advantages of great implementation and upgrading flexibility.

As it should be clear from the description of the flow charts provided above, the necessary operations are extremely simple, above all in the case of unitary-coefficient FIR filtering with order equal to a power of 2.

The required memory space and computational capacity are extremely limited, especially when the filtering is carried out sample by sample, as in the illustrated flow charts.

In this case, the required memory space for the video signal S can be further reduced by providing a FIFO structure, wherein only the Nb samples equal to the maximum filtering order used are stored.

The filtering operation at the ith sample can also be carried out starting from the value of the filtered signal at the previous sample, considering that the filtered signals $A(j)$ and $A(j+1)$ corresponding to two adjacent samples are the average of sets of samples of the video signal S which only differ in the first and the last element. Especially for high filtering orders, the filtering operation can be further quickened.

The electronic circuit corresponding to the analog or digital hardware implementation of the above method can be directly housed within a bar code reader.

The processing program corresponding to the software implementation of the above method can be embodied in a microcontroller directly housed within the bar code reader.

As an alternative, in particular when the code decoding occurs at a remote station from the bar code reader, such a processing program can be stored in any memory support, including floppy disks, CD-ROMs, CD-Rs and the like, and read-only memories.

Moreover, the processing program can be broadcast in a computer network, among which the Internet, and be thus carried on a carrier electrical signal.

What is claimed is:

1. A method for locating transitions between elements of a bar code, comprising the steps of:
   a) receiving a video signal representative of intensity of light diffused by the code as a function of position along a scan line of the code,
   b) performing at least one low-pass filtering of the video signal for obtaining a filtered signal,
   c) performing at least one companion between a first comparison signal and a second comparison signal, the first comparison signal being selected between the video signal and a first filtered signal, the second comparison signal being a filtered signal, the second comparison signal being more strongly filtered than the first comparison signal, and recognizing crossings between the first comparison signal and the second comparison signal as the transitions between the elements of the code at the respective positions.

2. The method according to claim 1, characterized in that in step a), the video signal is an analog video signal and in step b), the filtering is an analog filtering.

3. The method according to claim 2, characterized in that in step b) the filtering is performed with an essentially constant group delay.

4. The method according to claim 1, characterized in that in step a), the video signal is a sampled video signal and in step b), the filtering is a digital filtering.

5. The method according to claim 4, characterized in that in step b), the filtering is of the linear phase FIR type.

6. The method according to claim 5, characterized in that in step b), the filtering is of the equal-coefficient FIR type.

7. The method according to claim 6, characterized in that in step b). the filtering is of the unitary-coefficient FIR type.

8. The method according to claim 5, characterized in that in step b), the filtering is of the FIR type, of an order equal to a power of the base in which the sampled video signal is expressed.

9. The method according to claim 5, characterized in that the filtering of step b) is performed sample by sample during execution of step c).

10. The method according to claim 1, characterized in that each comparison of step c) comprises the step of;
    regarding a transition recognized in step c) as valid when in at least one position preceding the subsequent transition in the opposed direction recognized in step c), an absolute value of the difference between the comparison signals is greater than a preselected threshold quantity.

11. The method according to claim 10, characterized in that the threshold quantity is variable.

12. The method according to claim 11, characterized in that a falling threshold quantity for the positions corresponding to points of quite zones of the code is greater than the threshold quantity for the positions within the code.

13. The method according to claim 1, characterized in that each comparison of step c) comprises the steps of:
    rejecting all transitions recognized in step c) corresponding to positions preceding a first position wherein the difference between the first comparison signal and the second comparison signal is greater than a preselected threshold quantity, except for a transition corresponding to a immediately preceding position, and rejecting all transitions recognized in step c) corresponding to positions subsequent to a last position wherein the difference between the first comparison signal and the second companion signal is greater than the preselected threshold quantity, except for a transition corresponding to a immediately subsequent position.

14. The method according to claim 1, further comprising the steps of:

comparing sets of transition, obtained in the comparisons of step c), and selecting a most suitable set of transitions for decoding.

15. The method according to claim 1, characterized in that all sets of transitions obtained in the comparisons of step c) are provided for decoding.

16. The method according to claim 1, further comprising the steps of:

repeating at least once the previous steps for a respective video signal of a subsequent code scan, comparing sets of transitions obtained in the comparisons of step c), and selecting a most suitable set of transitions for decoding.

17. The method according to claim 1, further comprising the steps of:

repeating at least once the previous steps for a respective video signal of a subsequent code scan, and providing all sets of transitions obtained in the comparisons of step c) for decoding.

18. The method according to claim 1, further comprising the steps of:

repeating at least once the previous steps for a respective video signal of a subsequent code scan, evaluating statistical parameters relating to the video signal and/or to sets of recognised transitions, and setting the operating parameters for a subsequent iteration based on statistical parameters evaluated in the previous iteration.

19. An executable program of coded instructions which, when executed, performs the steps of the method of claim 1.

20. The program according to claim 19, embodied in a microcontroller.

21. The program according to claim 19, stored in a computer memory.

22. The program according to claim 19, embodied in a read-only memory.

23. The program according to claim 19, carried on a carrier electrical signal.

24. An electronic circuit suitable to carry out the steps of the method of claim 1.

25. A bar code reader comprising an electronic circuit according to claim 24.

26. A bar code reader comprising a microcontroller which executes the program of claim 19.

27. A method for localizing a bar code, comprising the steps of:

a) receiving a video signal representative of intensity of light diffused by the code as a function of position along a scan line of the code;

b) performing at least one low-pass filtering of the video signal for obtaining a filtered signal;

c) performing at least one comparison between a first comparison signal and a second comparison signal, the first comparison signal being selected between the video signal and a first filtered signal, and the second comparison signal being a filtered signal, the second comparison signal being more strongly filtered than the first comparison signal;

d) recognizing crossings between the first comparison signal and the second comparison signal as the transitions between the elements of the code at the respective positions;

e) rejecting all recognized transitions that correspond to positions preceding a first position wherein the difference between the first comparison signal and the second comparison signal is greater than a preselected threshold quantity, except for a transition corresponding to a immediately preceding position; and f) rejecting all recognized transitions that correspond to positions subsequent to a last position wherein the difference between the first comparison signal and the second comparison signal is greater than the preselected threshold quantity, except for a transition corresponding to a immediately subsequent position.

* * * * *